July 12, 1960 F. J. MATHEWS 2,945,114
HEATING DEVICE
Filed July 29, 1957
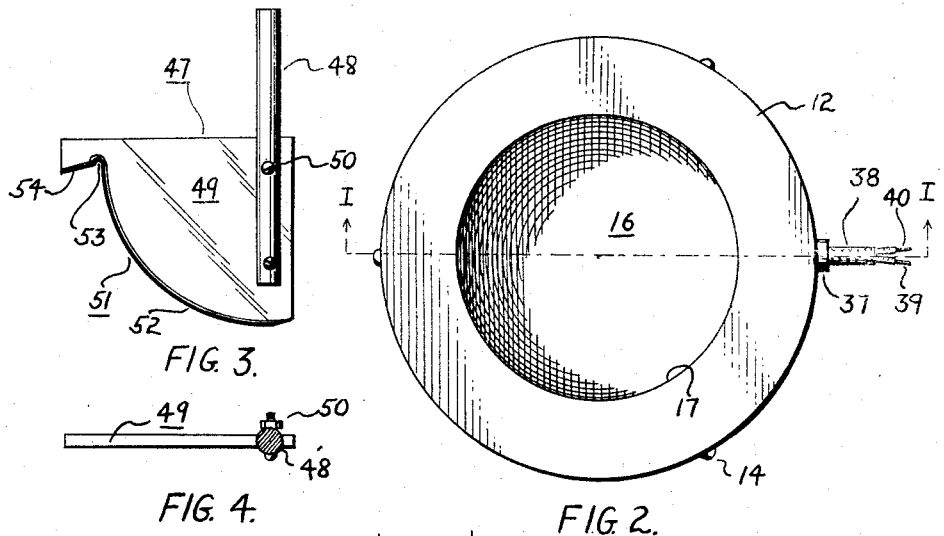
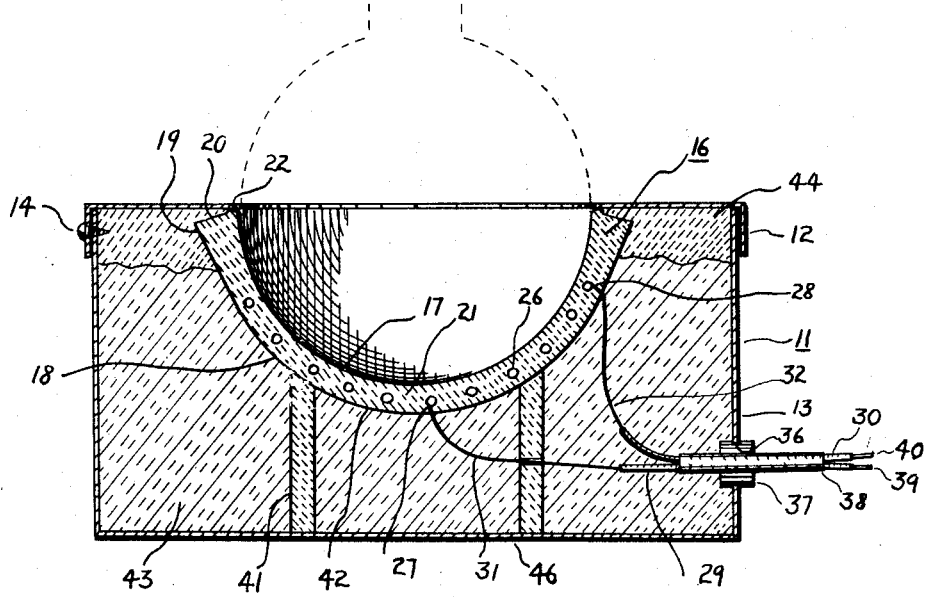
INVENTOR.
Frederick J. Mathews
BY Richard R. Mybeck
HIS ATTORNEY

2,945,114
HEATING DEVICE

Frederick John Mathews, P.O. Box 184, Beloit, Wis.

Filed July 29, 1957, Ser. No. 674,809

7 Claims. (Cl. 219—43)

This invention relates to heating devices in general and more particularly to electrical resistance heaters of the type known as contour heaters, to methods for making such heaters, and to a special tool for facilitating such methods.

In many chemical laboratories, it is frequently necessary to heat mixtures of flammable chemicals in laboratory vessels such as round bottom flasks, Kjeldahl flasks, Florence flasks, Erlenmeyer flasks etc., and beakers in order to maintain and/or initiate a desired chemical reaction. For many years this heating was performed with dangerous gas flames in apparatus such as the Bunsen burner, the gas hot plate etc. Eventually electric heating found its way to the chemical laboratory and the hot plate, the cone-type heater (the heating element is arranged in the shape of a cone), and more recently, the contour heater became more or less standard equipment.

Each of these types of electrical heating devices have significant limitations and disadvantages, some of them quite severe. For example, the use of the hot plate is limited because of its flat surface and its limited maximum heat while the cone-type has exposed wires which renders it extremely dangerous for heating flammable mixtures because of the ever present possibility of igniting a vapor-air mixture upon contact with an exposed hot wire. Of the three, the contour-type is clearly the safest and the most efficient.

Contour heaters or, heating mantles, as they are sometimes called, are generally of two types, viz., the glass fabric type in which an insulated nickel-chromium element is fastened to the inside of a cavity by thread or wire and then covered by a piece of glass fiber cloth; and the metal fabric type in which the flask is suspended adjacent the heating element in a woven metal mesh basket.

Each of these types are also beset with numerous disadvantages. For example, the glass fabric type: is incapable of high temperatures because the glass insulation around the wires will melt and the wires will short circuit; is not rigid structurally and therefore causes burn-outs and spotty heating; provides heating which occurs too high on the sides of the flask; is made of material (glass fabric) the exterior of which deteriorates rapidly upon chemical spillage; has strict voltage limitations which increase the chance of burn-out particularly when the equipment is operated by the student or novice; and is not available in smaller sizes, e.g. 10 ml. and 25 ml. because of its design. The metal basket type likewise suffers because of the air voids created between the flask and the heating element which causes inefficient heating and provides a collection zone for flammable mixtures which upon ignition are extremely hazardous.

The third type of contour heater, namely, the hard refractory suspended shell type, was introduced in an attempt to overcome certain of the deficiencies of the prior art. It too failed its attempt to cure the ills besetting contour heaters. By virtue of its basic structure, viz., suspending the heater shell from the top of the housing, it created a need for a heater shell material of significantly high tensile strength. This in turn caused the heater shells to be exceptionally thick in size and hard thereby being slow to transfer heat, clumsy to handle, a cause of flask fracture, and even still exceptionally fragile in normal laboratory use.

The present invention proposes to introduce a new type of contour heater to the art, namely, the soft refractory cement type which by virtue of its novel structure and the materials used in its fabrication enables the attainment of temperature ranges, efficiency, sizes, ruggedness, and safety heretofore believed unobtainable.

It follows, therefore, that a primary object of the present invention is to provide an improved heating device which entirely eliminates the tension stresses in the heater shell and which provides for the heater shell to be supported by a compression member interposed between a lower portion of the heater shell and the housing of the device thus permitting the utilization of a soft low tensile refractory material in the fabrication of the shell in thinner sections than heretofore believed possible.

Another object of the present invention is to provide an improved electric contour heater, the design of which can readily be adapted for use with all of the several flasks, beakers and the like found in the normal chemical laboratory.

Another object of the present invention is to provide an improved electrical contour heater characterized by a novel arrangement of parts to permit the utilization of materials heretofore believed incapable of adaptation to heaters of this type.

Another object of the present invention is the provision of an improved electrical heating unit having a fibrous heating shell characterized by a high resistance to thermal shock.

Another object of the present invention is the provision of an improved electrical heating unit having a heating shell consisting of a soft refractory material which cushions the glass receptacle being heated and will not harm or otherwise fracture the glass in contact with it.

A still further object of the present invention is the provision of an improved electrical heater of the contour type characterized by a compression supporting column holding the heater shell in place thus obviating the high tensile strength heretofore required of heater shell materials.

An even further object of the present invention is the provision of an improved electrical contour heater characterized by minimal heat transfer between the heater shell and its housing.

Yet another object of the present invention is the provision of an electrical contour heater characterized by an improved thermal seal between its heated parts and its housing.

Still another object of the present invention is to provide an improved insulating material for fabricating electrical heaters characterized by its workability when wet, its rigidity and resistance to compression forces when dry, and its resilient cushioning reaction to harder substances regardless of its physical state.

Still another object of the present invention is to provide an improved method and tool with which improved heating devices can be fabricated.

These and still further objects of the present invention which will appear are fulfilled in a manner which is clearly apparent from the following detailed description in conjunction with the accompanying drawing in which:

Figure 1 is a cross-sectional view of a heating device embodying an aspect of the present invention taken along lines I—I of Figure 2;

Figure 2 is a plan view of the heating device of Figure 1;

Figure 3 is a side elevation of a novel tool embodying an aspect of the present invention; and Figure 4 is a plan view of the tool of Figure 3.

*Structural arrangement*

Referring to the drawing, and particularly Fig. 1, the device of the present invention comprises a canister type housing 11 having a top member 12 and a body member 13. Housing 11 may be fabricated from light gauge tin-plated steel, aluminum, stainless steel or like material and ultimately will be painted with a heat resistant, fume and solvent resistant paint. When assembled, top member 12 is detachably secured to body member 13 in any suitable manner, such as with screws 14.

Within housing 11 is disposed heater shell 16 consisting of a substantially hemispherical shell having a wall thickness of preferably from 5–10% of its inside diameter. This wall may be flared out at its top to provide a somewhat thicker dimension (10–20%) for reasons which shall be hereinafter explained.

Specifically, heater shell 16 comprises substantially hemispherical inner and outer surfaces 17, 18, respectively, inner surface 17 also being referred to herein as vessel receiving surface 17. Outer surface 18 is disposed in spaced relationship to vessel receiving surface 17 and is generally coaxial therewith except that its outermost edge 19 may be flared divergently from surface 17 to provide a greater dimension to annular beveled surface 20, which joins inner surface 17 and outer surface 18, when it is so desired.

The spaced relationship between inner surface 17 and outer surface 18 defines a substantially hemispherical intermediate shell portion 21 therebetween.

Inner surface 17, outer surface 18, beveled surface 20, and intermediate shell portion 21 all preferably consist of the improved material of the present invention which I shall describe more fully in later paragraphs.

Beveled surface 20 further comprises a ridge portion 22 defined thereupon adjacent vessel receiving surface 17 and which provides the sole thermal contact surface between heater shell 16 and top member 12.

Disposed within intermediate shell portioin 21 is heating element 26. In my preferred embodiment, heating element 26 is disposed a substantially uniform distance from vessel receiving surface 17 and comprises a helical coil of resistance wire such as Chromel A, Nichrome and the like, of suitable gauge, resistance and coil diameter which has been stretched to a suitable length and embedded in the matrix by any suitable method such as that hereinafter described in detail.

Heating element 26 thus comprises a first and a second terminal portion, 27, 28, respectively. Extending outwardly from terminal portions 27, 28, for electrical connection with lead in wires 29, 30, respectively, are respectively lead portions 31, 32. Passage for lead in wires 29, 30, from within housing 11 for connection to a suitable external power supply (not shown) is provided by aperture 36 defined in body member 13. While aperture 36 may be defined anywhere in housing 11, it is generally more convenient to keep lead in wires 29, 30, in a relative lower position so that they will lay unobtrusively on the work surface upon which the device is placed rather than higher where they will hang and can be snagged and create an obstacle.

Lead in wires 29, 30, are conducted from within housing 11 to the power supply through aperture 36 either by porcelain or steatite bushing insulators (not shown) or a strain relief 37. When a strain relief 37 is utilized, lead in wires 29, 30, preferably comprise short pieces of stranded copper or nickel which are preferably silver soldered to the ends of lead portions 31, 32 respectively. Lead-in wires 29, 30, are then insulated with a tube of silicone-rubber-coated fiber-glass tubing 38 or similar material as they pass through strain relief 37 to the outside of housing 11.

The outermost ends of lead-in wires 29, 30, may be provided with clip contactors 39, 40, respectively or may be provided with any of the conventional type of plug-in connectors (not shown) according to the pleasure of the operator of the device.

Interposed between and in intimate contact with heater shell 16 and the bottom surface 46 of body member 13 is supporting member 41 which likewise is preferably composed of my improved material, although it may be made of other refractory materials or even a metal, such as galvanized iron or nickel. From its abutting relationship with bottom surface 46, supporting member 41 extends upwardly into complementary supporting engagement with a lower portion 42 of outer surface 18 of shell 16. For additional support, supporting member 41 may be cemented to shell 16 with any of the commercially available heat resistant cements.

Supporting member 41 as shown in Fig. 1 is annular in cross-section although it may be formed of refractory material in columnar shape having a concave upper face with equally satisfactory functional results.

A suitable loose mineral insulation 43, such as rock wool, expanded mica (e.g., vermiculite) or expanded glass pellets is packed within housing 11 to substantially fill the voids defined between heater shell 16, supporting member 41 and the inner surface of body member 13.

On top of insulation 43 and beveled surface 20 is disposed a layer of chemical set, heat resistant, electrically non-conductive cement 44 to provide a thermal seal between heater shell 16 and top member 12, the sole heat conductive surface between the beveled surface 20 of shell 16 and top member 12 of housing 11 being the small ridge 22 defined upon beveled surface 20.

Cement 44 may further provide an integral bond between top member 12 and beveled surface 20 which can be readily effected by placing top member 12 in position while cement 44 is wet. Upon hardening, cement 44 provides a hard porous ring which firmly holds heater shell 16 to resist all horizontal motion.

*Method of fabrication*

A preferred method of fabricating the device of the present invention comprises firstly forming or otherwise obtaining the canister type housing 11; defining aperture 36 in body member 13 thereof; placing supporting member 41 on bottom surface 46 of housing 11; partially filling housing 11 with insulation 43; placing heater shell 16 on supporting member 41 and cementing it thereto; connecting lead portions 31, 32, of heating element 26 to lead-in wires 29, 30, respectively; placing strain relief 37 in aperture 36; feeding lead-in wires 29, 30 through strain relief 37 to outside of housing 11; filling housing 11 substantially to its top with insulation 43; depositing a heavy layer of cement 44 on top of both insulation 43 and beveled surface 20 of shell 16; before cement 44 becomes set, placing top member 12 snugly on body member 13 and inserting screws 14 to secure it thereto; and painting housing 11.

As can be seen, the assembly of the device involves generally the routine mechanical manipulations of hole cutting or punching, placing parts, depositing insulation and cement, and painting etc.

However, in the fabrication of heater shell 16 and supporting member 41, which shall now be described in detail, the present invention provides a large degree of novelty and ingenuity.

In fabricating the heater shell 16, the improved cement mixture of the present invention is thoroughly mixed in a dry state by stirring or by rotating in a closed drum. When the ingredients have been thoroughly mixed, water is gradually added to a predetermined quantity of the dry mixture until, with continued agitation, the consistency of putty is obtained.

When this stage has been reached, a thin layer (about ½ the thickness of the final shell) is uniformly deposited on the inside of a suitably designed cavity mold having a shape corresponding generally to the shape of the vessel for which the device will be used.

Cavity molds comprising plastic, paraffin coated wood or paraffin coated cement provide quite desirable results in the method of this invention.

After the layer of cement has been deposited in the mold, one end (e.g. 31) of the helically coiled resistance wire 26 (of suitable gauge, resistance and coil diameter and coiled on an arbor (not shown) of suitable diameter and stretched to a suitable length with each end straightened for several inches to provide what has been heretofore referred to as lead portions 31, 32) is inserted through a small hole located at the bottom center of the mold, the straight portion of the end being pulled through the hole. The helical portion of the resistance wire is simultaneously spiraled tightly about the small center hole and pressed into the cement, the spirals being maintained a suitable distance apart, for example, one-eighth to three-quarters inch. The spiral is continued around and up the side of the mold until all of the helically coiled portion of the wire has been pressed into the cement. When all of the helically coiled portion of the wire has been pressed into the cement, the other of the straightened ends (e.g. 32) is inserted through a small hole provided near the top edge of the mold and pulled therethrough.

A second layer of the cement is now placed in the mold to completely cover the resistance wire. This layer, which when set will comprise vessel receiving surface 17, is then precisely shaped and formed by the special shaping tool shown in Figures 3 and 4 in a manner to be hereinafter more fully described.

After shaping, the shell is permitted to set on the mold for a suitable time, preferably at least 24 hours, and then removed from the mold. The shell is then further cured for several days after which it is ready to be assembled in a finished device as previously described.

Supporting member 41 is preferably made by depositing or otherwise placing its desired material, for example, my improved cement, about a cylindrical mold of suitable dimensions, placing the material-covered mold in a vertical position on a flat surface to form its bottom edge, and defining its upper edge so that it will snugly engage outer surface 18 of shell 16 in complementary relationship thereto. The mold is then removed and the hollow cylinder or annular member thus formed is permitted to dry and cure. The annular member is now ready to be assembled into a finished device as previously described. Obviously when one desires a solid cylindrical supporting member, one will substitute a hollow mold of suitable dimension for the cylindrical mold previously used and pack the material into the mold instead of placing it around the mold.

Cement composition

The refractory material heretofore identified as the preferred material for forming heater shell 16 and as a desirable material for forming supporting member 41 comprises a soft refractory material containing by weight from about 30 percent to about 60 percent ground asbestos, from 0 to about 35 percent Alundum and from about 20 percent to about 50 percent Portland cement. A preferred composition of this material consists of about 40% by weight asbestos, 25% Alundum, and 35% Portland cement.

My new refractory material composition is particularly significant because it provides a soft refractory, i.e., it can be scored with a finger nail and yet will resist temperatures up to 1200° F. without significant loss of structural strength, is fibrous and tough, and has high resistance to thermal shock and high heat conductivity. Its softness on the other hand not only enables it to obviate the possibility of glass breakage characteristic of previously known hard refractories, it in fact provides a resilient cushion upon which the glass vessels being heated may rest.

Tool

Referring now to Figures 3 and 4, special tool 47 comprises a shank member 48 suitably secured to a shaping member 49 as by screws 50.

Shaping member 49, which can be formed of any suitable material, such as glass, plastic, metal and the like, comprises a shaping edge 51 having an arcuate portion 52 contoured to correspond generally to the shape of the vessel to be heated therein, for example, the flask shown in phantom in Fig. 1.

Adjacent arcuate portion 52 of the shaping edge 51 are defined reentrant groove 53 and angularly disposed straight portion 54 which are respectively particularly designed to form ridge 22 and beveled surface 20 on shell 16.

Shank member 48 is of suitable design so that it may be inserted into the chuck of a conventional drill press if it is desired to mechanically impart rotation to the tool. Otherwise the tool may be rotated manually if it is so desired.

Operation

Once the heating device is assembled and in the laboratory, it is ready for operation. A flask, such as that shown in phantom in Fig. 1, containing the reagents which are desired to be heated, is placed through the opening in top member 12 into shell 16 on vessel receiving or inner surface 17. A plug or other suitable means in electrical connection with lead in wires 29, 30 is inserted or otherwise connected with an electrical power supply to provide the transmission of electricity through heating element 26 which by virtue of its resistance characteristic creates heat which is transmitted uniformly through inner surface 17 to the contents of the flask. When the desired reaction is effected or the flask has otherwise been heated sufficiently, the electrical connection between the lead in wires and the power supply is broken in any suitable manner such as by withdrawing a plug connected to the lead in wires from within a plug-in type connector box connected to the power supply.

Having thus described several features of my invention by way of exemplary embodiments, it will be understood that the invention is susceptible to modification in order to adapt it to different usages and conditions and, accordingly, it is desired to comprehend such modifications within this invention as may fall within the scope of the appended claims.

I claim:

1. A heating device comprising: a housing having a body member and a top member, said top member being detachably secured to said bottom member and having an opening defined centrally therethrough; a heater shell disposed within said housing and consisting of refractory material and having an inner surface, an outer surface and a beveled surface, said inner and outer surfaces being in spaced relationship to each other and interconnected at their edges by said beveled surface extending inwardly and upwardly from said outer surface to said inner surface, said beveled surface having an annular ridge defined thereon adjacent said inner surface, said inner surface defining an opening substantially in register with said opening in said top member; an electric heating element interposed between said inner and outer surfaces of said shell and helically embedded therein in substantially uniform spaced relationship to said inner surface, said element having a pair of spaced lead portions extending outwardly from said shell toward said housing; a pair of electrical conductors respectively connected to said pair of lead portions and adapted to establish electrical connection between an electric power supply and said element; an elongated annular support member intimately interposed between said body member and a lower portion of said outer surface of said shell for supporting in compression said shell in spaced relationship to said body member, said shell and said body member coactively defining a void therebetween; a plurality of insulating members disposed in and substantially filling said void for inhibiting thermal conduction between said housing and said shell; and an annular ring of chemically setting cement disposed in sealing engagement with said beveled surface and the uppermost of said insulating members and circumscribing said ridge, said top being surmounted upon said ring and said ridge and coacting with said support member and said insulating members to maintain said shell substantially stationary relative to said housing.

2. A heating device comprising a housing having a body member and a top member, said top member being detachably secured to said bottom member and having an opening defined centrally therethrough; a heater shell disposed within said housing and having an inner surface, an outer surface, and a beveled surface, said inner and said outer surfaces coacting with said beveled surface to define an intermediate shell portion therebetween and bounded thereby, said intermediate portion having adjacent the intersection of said inner surface with said beveled surface an annular ridge extending upwardly from said beveled surface, the edge of said inner surface defining a shell opening substantially in register with said opening in said top member; an electric heating element helically embedded in said intermediate section and having a pair of spaced lead portions extending outwardly therefrom and adapted for operative connection to an electric power supply; a support member intimately interposed between said body member and a lower portion of said shell for supporting in compression said shell in spaced relationship to said body member, said shell and said body member coactively defining a void therebetween, a plurality of insulating members disposed in and substantially filling said void for substantially inhibiting the passage of heat from said shell to said housing; and an annular thermal seal operatively interposed between said beveled surface and said top member and circumscribing said annular ridge.

3. A heating device comprising a housing having a body membere and a top member, said top member having an opening defined therethrough; a substantially hemispherical heater shell disposed within said housing and having a flange on the upper edge thereof, said shell being substantially in register with said opening in said top member and engaging said top member solely with said flange; an electrical heating element adapted for connection to an electric power supply and helically embedded within said heater shell; electrically non-conductive support means interposed between the bottom portion of said shell and said body member and extending substantially vertically therebetween for supporting said shell in said housing substantially in compression only to maintain said shell in spaced relationship to said body member; and insulating means operatively interposed between said heater shell and said housing for thermally insulating said housing relative to said shell.

4. A device for heating laboratory flasks of given peripheral contour comprising a heater shell having a concave inner surface with a contour generally complementary to said flasks, a convex outer surface, an intermediate portion interposed between said inner and outer surface, and a beveled surface extending upwardly and inwardly from said outer surface for interconnecting said outer surface with said inner surface; a heating element embedded within said intermediate portion and having leads extending therefrom adapted for connection to a power supply source; a housing having a tubular portion, a bottom portion and a top portion, said tubular portion circumscribing said shell in spaced relationship thereto and being enclosed by said bottom portion at one end thereof and by said top portion at another end thereof, said top portion engaging said shell only at the uppermost portion of said beveled surface and having an opening defined therein in register with and substantially corresponding dimensionally to said concave inner surface; and tubular electrically non-conductive support means operatively interposed between and in engagement with said bottom portion and said convex surface for supporting said shell in spaced relationship to said housing.

5. A device for heating laboratory flasks of a given peripheral contour comprising a heater shell having a concave inner surface with a contour generally complementary to the peripheral contour of said flasks, a convex outer surface, an intermediate portion interposed between said inner and outer surface, and a beveled surface interconnecting said inner and outer surfaces and having an upstanding flange defined thereupon adjacent said inner surface; a heating element embedded within said intermediate portion having lead wires extending therefrom adapted for connection to a power supply source; a housing having a tubular portion, a bottom portion and a top portion, said tubular portion circumscribing said shell in spaced relationship thereto and being enclosed by said bottom portion at one end thereof and by said top portion at another end thereof, said top portion engaging said shell only at said flange and having an opening defined therein in register with and substantially correspondingly dimensionally to said concave inner surface; and a tubular electrically non-conductive support means operatively interposed between and in engagement with said bottom portion and said convex surface for supporting said shell in fixed spaced relationship to said housing.

6. A device for heating laboratory flasks of a given peripheral contour comprising: a housing having a predetermined height; a thermally conductive electrically non-conductive heater shell mounted in said housing and having minimal thermal conductivity with said housing, said shell comprising a heatable body portion having a concave inner surface with a contour generally complementary to said flasks, a convex outer surface, a beveled edge extending inwardly and upwardly from said outer surface to define a corner with said inner surface, a tubular supporting portion extending away from said outer surface to define with said corner a dimension substantially equal to the predetermined height of said housing whereby said shell upon insertion into said housing is supported within said housing in compression only and the thermal conductivity between said shell and said housing is limited to through said corner.

7. A device for heating laboratory flasks of a given peripheral contour comprising: a housing having a predetermined height; a thermally conductive electrically non-conductive heater shell mounted in said housing and having minimal thermal conductivity therewith, said shell comprising a heatable body portion having a concave inner surface with a contour generally complementary to said flasks, a convex outer surface, a beveled edge interconnecting said surfaces and having an upstanding flange defined thereupon adjacent said inner surface, a tubular supporting portion extending away from said outer surface and defining with said flange a dimension substantially equal to said predetermined height of said housing whereby said shell upon insertion into said housing is supported within said housing in compression only and the thermal conductivity between said shell and said housing is limited to through said flange.

References Cited in the file of this patent
UNITED STATES PATENTS 1,139,076     Rutenber  ---------------  May 11, 1915

UNITED STATES PATENTS

| | | |
|---|---|---|
| 1,242,687 | Harth | Oct. 9, 1917 |
| 1,349,546 | Benton | Aug. 10, 1920 |
| 1,408,401 | Richards | Feb. 28, 1922 |
| 1,666,831 | Pandolfo | Apr. 17, 1928 |
| 1,826,577 | Schantz | Oct. 6, 1931 |
| 1,933,128 | Wiegand | Oct. 31, 1933 |
| 2,084,232 | Williamson et al. | June 15, 1937 |
| 2,176,382 | Smith | Oct. 17, 1939 |
| 2,284,078 | Wiegand | May 26, 1942 |
| 2,409,244 | Bilan | Oct. 15, 1946 |
| 2,419,848 | Morey | Apr. 29, 1947 |
| 2,498,442 | Morey | Feb. 21, 1950 |